May 16, 1967  R. L. NORDSTROM  3,319,801
PORTABLE DISPLAY DEVICE
Filed Aug. 20, 1965  3 Sheets-Sheet 1

INVENTOR.
RICHARD L. NORDSTROM
BY
Wallace Hinze and Dorn
ATTORNEYS

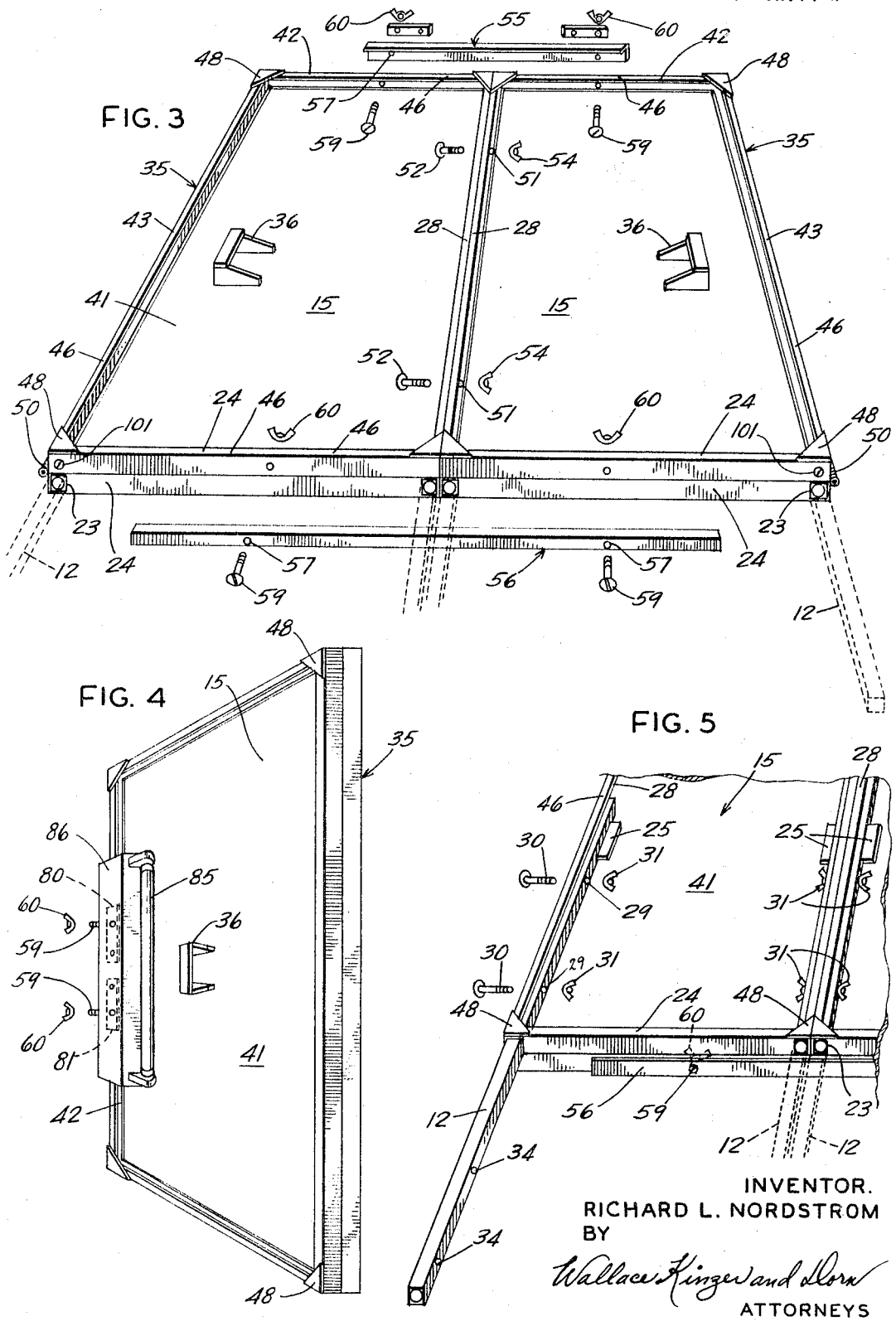

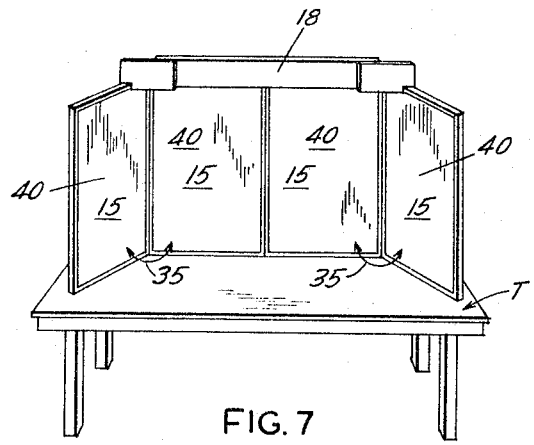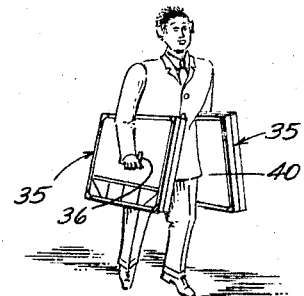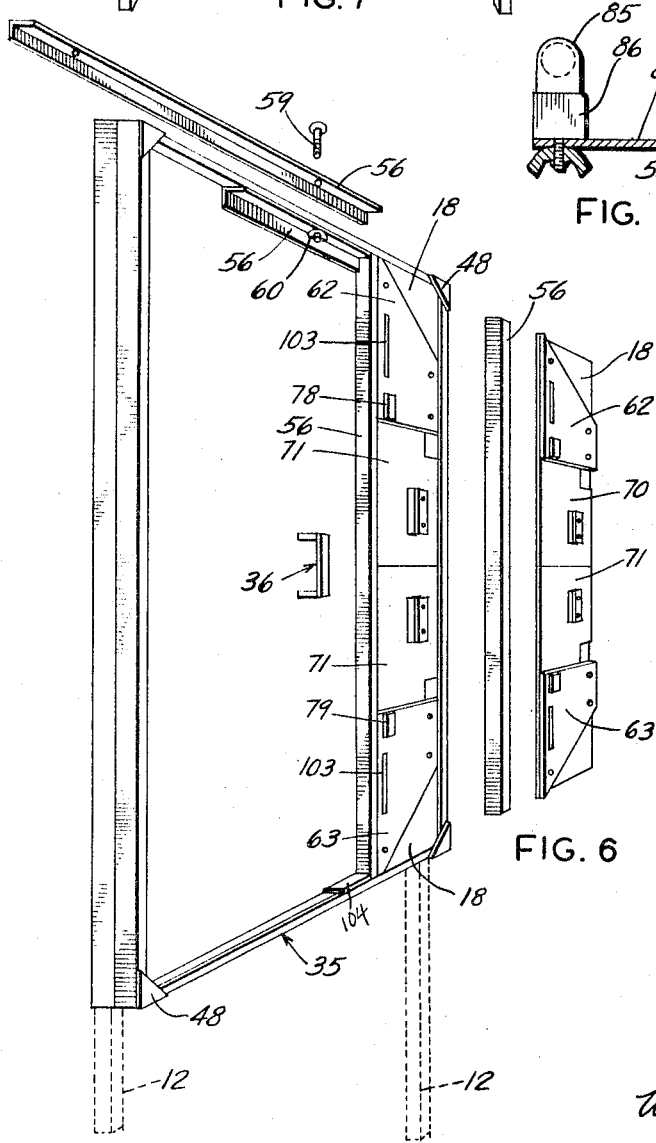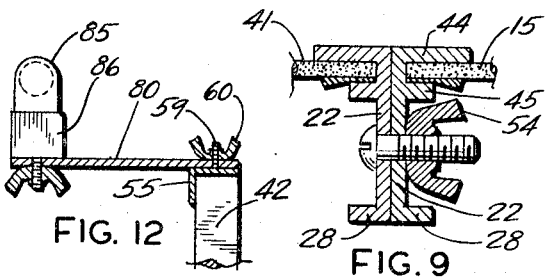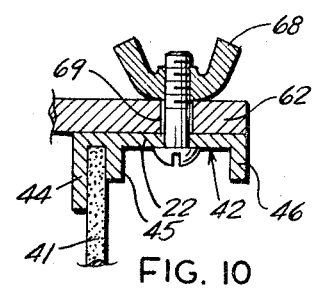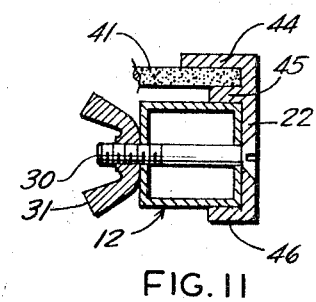

United States Patent Office 3,319,801
Patented May 16, 1967

3,319,801
PORTABLE DISPLAY DEVICE
Richard L. Nordstrom, 806 Clinton Place,
Evanston, Ill. 60201
Filed Aug. 20, 1965, Ser. No. 481,276
4 Claims. (Cl. 211—178)

ABSTRACT OF THE DISCLOSURE

A portable display device for advertising or educational displays which can be carried by one person and easily erected without the use of special tools. A pair of hinged panels form each of two separate modules which are separated for carrying under arm and which are joined together to form the display device. Each module has a pair of extensible or retractible legs by which the device can be used "on floor" which legs extended or "off floor" with the legs retracted and the panels resting on a table or the like. A light source and a header assembly may be attached to the modules in either a display position or a carrying position. A horizontal shelf may also be provided to afford a table for supporting various materials.

---

This invention relates to a portable display device for advertising or educational displays.

This invention is directed to a light weight and portable display device which is readily portable by one person and which is easily and quickly erected in nearly any location such as convention halls, lobbies, meeting rooms or the like to display three dimensional objects, advertising or educational messages. Accordingly, an object of the present invention is a novel display device having the foregoing characteristics.

Another object of the invention is a novel portable display device comprised of two modules, designed for carrying by one person, and joinable to form a unitary display device. More specifically, and as a further object of the invention, the two modules are sized and constructed for convenient carrying under arm by one person. Another object of the invention is increasing the amount of display area and the portability of such a device by having hinged panels in each module opening to provide a large display area.

Another object of the invention is a quickly erectable display device capable of being assembled by one person without any tools and without need for storage of crates, boxes or a carrying case therefor.

A further object is a self crating display device thereby eliminating the need for a carrying case.

Another object of the invention is a display device convertible to either an "on floor" or "on table" display useage.

A further object of the invention is a portable and demountable display having generous vertical display areas and generous horizontal display areas.

A further object of the invention is a low cost display device employing identically-shaped channel members as framework for the display wall panels and for securing components in the rear side of display device and within said channels when the modules are assembled for transporting.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 3 illustrates the manner of connection between a pair of display panels of the display device;

FIG. 4 illustrates the light housing secured to a panel or module in its portable position;

FIG. 5 illustrates a retracting leg;

FIG. 6 illustrates the manner of securing sign elements to a panel or module in a portable position;

FIG. 7 illustrates the display device supported on a table;

FIG. 8 illustrates the under arm carrying of the two modules for the display stand;

FIGS. 9, 10 and 11 is a sectional view of the preferred form of framework channels; and FIG. 12 is a sectional view taken along the lines 12—12 of FIG. 1 and showing the mounting of the light fixture.

Figure 1:
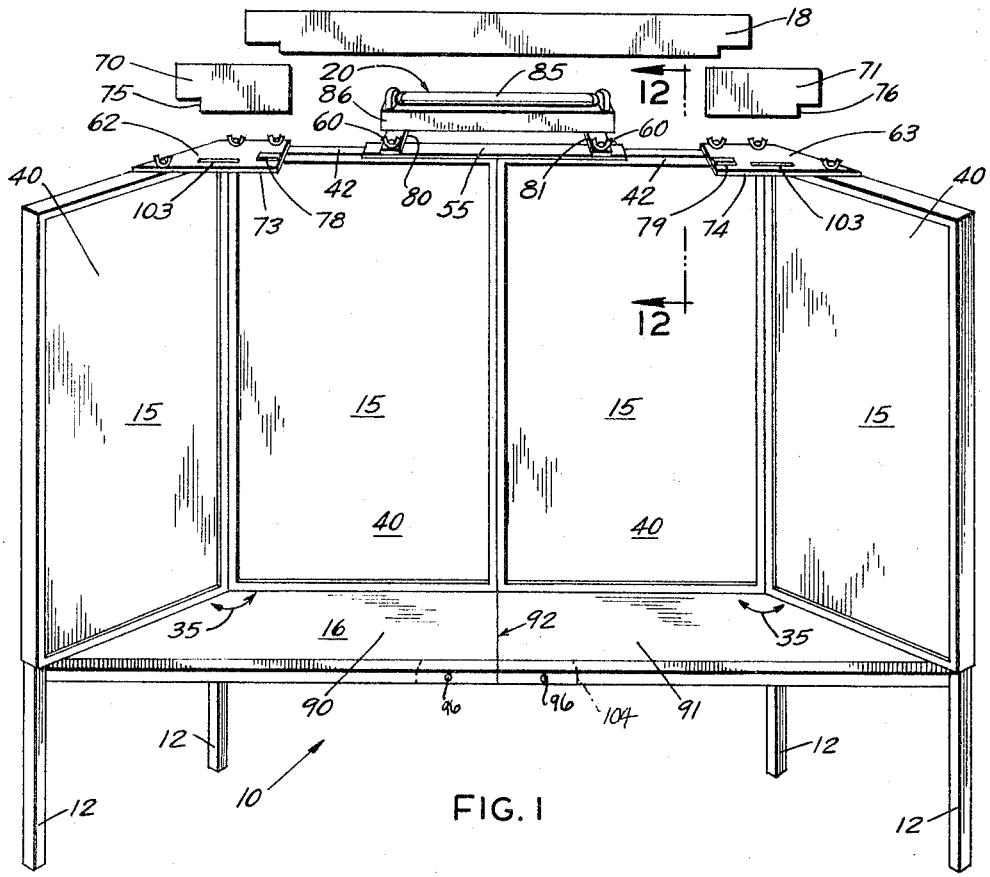
FIG. 1 is a perspective view of a display device constructed in accordance with the principles of the present invention.

Referring now to the drawings and more particularly to FIG. 1, there is illustrated a display device 10 which includes four supporting legs 12 extending from the display panels to the floor to support wall panels 15 and an optional horizontal shelf 16. The outermost two panels 15 are inclined to the common plane of the innermost panels 15; and the outer inclined panels are termed wing panels hereinafter. Extending between the two winged walls 15 is a header plate 18, which is usually inscribed with a company name or other advertising or educational material and behind which is situated a lighting fixture 20 for illuminating the header 18.

The display device 10 is adapted for "on floor," as illustrated in FIG. 1, and is also convertible for "off floor" use on a table or other support such as the table T of FIG. 7, wherein the legs 12 remain retracted within wall panels 15. The legs 12 are retractable into the general confines of the respective wall panels 15 as is apparent from FIGS. 3 and 5, so that the bottom edges, FIG. 7, of the respective panels may be flush or nearly flush with the surface of the supporting table T. Preferably, the legs 12, are tubular or bar construction, FIG. 11, and are guided through an aperture 23, FIG. 5, in lower channel frame member 24 of the panels 15. The legs 12 are each guided for sliding movement by a guiding block 25 secured thereto in spaced relationship to a longitudinally extending framework channel 28. The leg 12 is detented or locked in its extended position when an upper set of holes 29, FIG. 5, are aligned with similar spaced holes in the side frame member 28 and receiving threaded bolts 30. When the legs 12 are in their retracted position within the confines of the panels 15, the legs 12 are locked against movement by the same bolts 30 and nuts 31 inserted into the holes 34 on the lower portion of the legs 12, as best seen in FIG. 5.

Important aspects of the present display device are that of being readily portable by a salesman or other person and of being assembled in confined locations without the use of special foundations or tools or without the need to store a shipping case. As best seen in FIG. 8, each of the wing wall panels 15 is adapted to be folded into face-to-face relationship with an innermost wall panel 15 for forming a module 35 adapted to be carried under arm in much the manner of portfolio cases. Preferably, the panels 15 are folded together at the display wall surfaces 40 to protect any advertising matter thereon. Conveniently spaced handles 36, FIGS. 6 and 8, provide grips for holding the modules 35 while being carried under arm.

Another important aspect of the present invention is the self crating feature wherein each of the individual components of the display device is adapted to be contained within the modules 35 when transporting; thus, a person need merely handle two modules 35 and has no carrying case to store after the display device is erected. Also the portability of the modules 35 is increased by the design and by light weight components employed in the display device 10. To this end, the main display area of each of the panels 15 is afforded by a light weight hard board material 41 which can be of the so called peg-board type with a large number of apertures therein. Each of the walls 41 has secured around its four edges framework elements 24, 28, 42 and 43. The framework elements 24, 28, 42 and 43 are of identical twin channel cross-section 22, FIGS. 9, 10 and 11 and are preferably formed by an extrusion of aluminum or other light weight material. The twin channel cross-section 22 includes a first pair of flanges 44 and 45, which are spaced to afford a wedge fit insertion of the edges of the respective panel material 41 between the flanges 44 and 45. Where the channel cross-section 22 is to receive a leg 12, as best illustrated in FIG. 11, the second channel formed between flange 45 and flange 46 serves to guide the leg 12. The second channel also functions to store the light fixture and sign elements when in a portable position.

To afford additional stability for the framework at the joints, it is preferred that the side members 28 and 43 be joined to the respectively adjacent top and bottom members 24 and 42 by means of triangular shaped corner brackets 48, FIG. 3, which are secured by fasteners or adhesives to the respective outermost flanges 46 of the respective channels. Screw 101 provides additional rigidity in securing frame members 28 to 42 and 24 to 42 by wedging into the small channel between flanges 44 and 45 of frame members, FIG. 9.

Each of the modules 35 includes two panel portions 15 which are joined together by hinge means 50, FIG. 3, which is preferably in the form of a continuous piano type hinge extending the full length of the respective side frame members 43 to which the portions of the hinges are secured. Manifestly, the hinges 50 permit the panels 15 to be disposed in face-to-face relationship, as shown in FIGS. 3 and 8 and to be spread into the winged relationship shown in FIGS. 1 and 7.

For the purpose of securing the respective modules 35 together to constitute the display device 10, it is preferred that the inner two frame members 28, FIG. 3, have aligned holes 51 for receiving suitable bolts 52 on which are threaded wing nuts 54 or other quick operating mechanical fasteners. Also, the respective modules 35 are secured to each other by top and bottom stiffener angles 55 and 56, respectively, each of which is apertured at 57 to receive bolts 59 which are fastened by wing nuts 60. It is preferred that the top and bottom angles 55 and 56 be so dimensioned that they fit over the corner of the twin channel frames and in flush engagement with the outer leg 46 of the respective twin channel braces 24. Thus, it will be seen that the two modules 35 are joined together in stable, parallel relationship one to another along a common plane.

Figure 2:
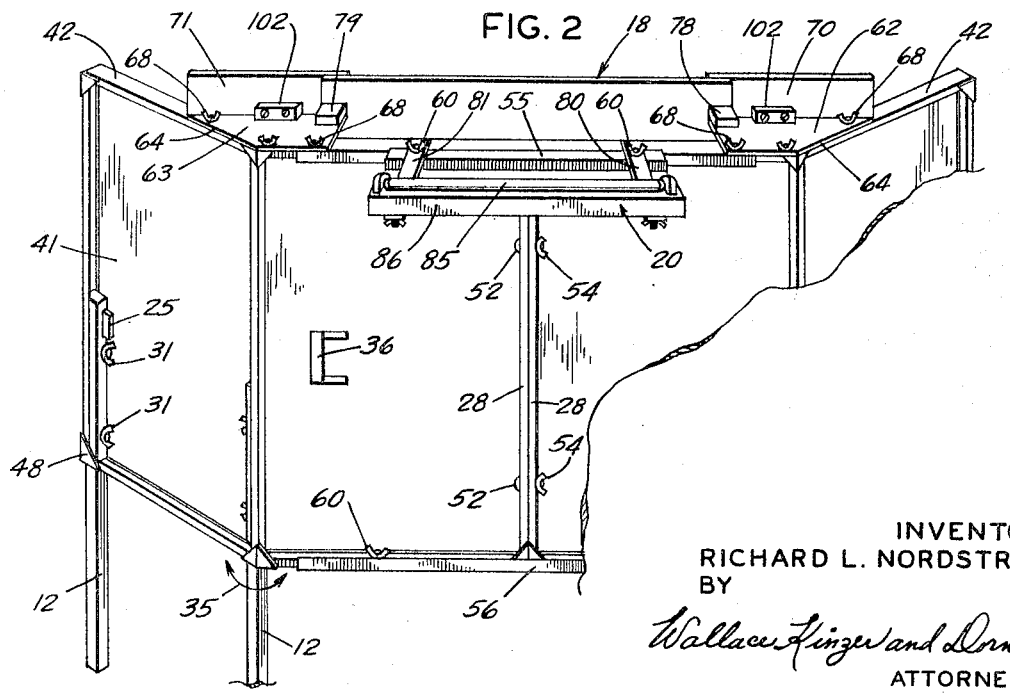
FIG. 2 is a rear perspective view of the display device of FIG. 1.

The wing panels 15 increase the stability of the display device 10 against toppling, and the wing panels are retained in their inclined positions relative to the two joined center panels, by means of corner brace plates 62 and 63, FIGS. 1 and 2. The corner brace plates 62 and 63 are relatively flat plates having an inclined edge 64 cut to be flush with the topmost frame 42 of the respective wing panels 15 when the brace plates 62 and 63 are secured in position. To secure the brace plates 62 and 63 in position, bolts 68 or other mechanical fasteners extend upwardly through apertures 69, FIG. 10, of a topmost channel brace 42 and through the corner brace plates 62 and 63 and have the wing nuts 68 fastened thereon. If desired, the apertures 69, FIG. 10, in the corner brace plates could be in the form of slots to permit adjustment of the angle of inclination of the respective wing panels relative to the center panels 15.

The corner plates 62 and 63 also function to support the sign header 18 which is preferably made of a translucent plastic material which is adapted to be fastened to a pair of spacers 70 and 71. The spacers 70 and 71 engage the front edges 73 and 74 of the corner plates 62 and 63. Also the spacers 70 and 71 have notched corners 75 and 76 which are adapted to be fitted over the respective top brace members 42. Thus, the spacers 70 and 71 conceal the respective corner plates 62 and 63. Spacer blocks 78 and 79 are fastened to the top of each of the respective plates 62 and 63 to provide a wedge fit with the spacers 70 and 71 for the head 18. Cleats 102 on the back surfaces of spacers 70 and 71 secure spacers 70 and 71 to corner braces 62 and 63 by slipping into slots 103 in corner braces 62 and 63.

The light fixture 20 is adapted to be secured by spaced supporting plates 80 and 81 to the top brace members 42 and behind the sign header 18. The supporting arms 80 and 81 are inserted on top of the top angle 55 and the top panel frames 42 and bolts 59 are inserted through apertures (not shown) in the respective support arms 80 and 81. As shown in its preferred form, the light fixture 20 includes a lamp 85 of the long bulb, fluorescent or incandescent type and a suitable housing 86 therefor. Preferably, the lamp housing 86 is mounted by the arms 80 and 81 above the panels 15 and to the rear thereof. The bolts that secure the light fixture to the frame in a portable position, secure the fixture to supporting plates 80 and 81 through apertures in 80 and 81.

The display device 10 may also have incorporated therein the shelf 16 illustrated in FIG. 1. Preferably, the shelf 16 is formed of two shelf halves 90 and 91, a left and a right half, which are abutted along an interface 92 in alignment with the parting line between the two inner panels 15. The rearward edges of the shelf halves 90 and 91 are inserted between the bottom joining angle 56 and the lower braces 24 for the panels 15. The shelf halves 90 and 91 may be apertured to be secured by the respective bolts 59 and wing nuts 60 for the angle 56. The front corners of shelves 90 and 91 are bolted to the lower frame segments of the wing panels. The shelves are joined at the front edge of interface 92 by means of a short bar 94 placed behind the front angle-shaped edges of shelves 90 and 91. Bar 94 is fastened to the shelf edges by bolts and wing nuts.

Another important aspect of the present invention is that of a self crating feature, i.e., the feature of disassembling and carrying all of the components of the display device 10 in the two modules 35. As described hereinbefore, the legs 12 are retracted into the respective wing panels 15 and secured by the bolts 30 inserted through the apertures 34, FIG. 5, to lock the legs in their retracted position. The lighting fixture 20, FIG. 4, has its arms 80 and 81 pivoted inwardly and secured by bolts 59 and wing nuts 60 to the top brace 42. On the opposite module, as shown in FIG. 6, the header 18 is disassembled with spacers 70 and 71 disposed in the middle thereof. The corner plates 62 and 63 are placed to the header 18 adjacent the spacers 70 and 71. The top and bottom stiffener angles 55 and 56 are utilized to hold all these elements in fixed position when the module is being carried. The longer angle 56 is held in place on one end by cleat 104, on the other end by angle 55 which is secured to the panel frame by bolts 59 and wing nut 60. The shelf portions 90 and 91 are secured by their respective joining bars 94 and bolts 96 to the rear sides of one of the panels 15.

From the foregoing, it will be seen that the present invention includes a uniquely portable display device of light weight construction. Moreover, the display device is self crating and is quickly erected or disassembled without the use of any special tools. The display device has considerable flexibility in that it may be mounted on a floor or table and may be used with or without a shelf.

Hence, while preferred embodiments of the invention have been described and illustrated, it is to be understood that they are capable of variation and modification.

I claim:

1. A portable display device adapted to be manually transported and assembled on location, said display device convertible to a table supported device or convertible to a floor supported device, said display device comprising: a first display module including hinged panel portions, a second display module including hinge panel portions, means to secure said modules together, means to secure said panel portions of the respective modules in angular relationships to one another, leg means in at least one of said panel portions of said first and second modules, means to secure said legs in an extended position for supporting said display device on said floor and for securing said legs in a retracted position within said panel portions whereby said display device may be supported on a table.

2. A portable display device comprising: inner panel portions secured together in a common plane, outer panel portions secured to said inner panel portions and being inclined thereto, retractable and extendible leg means within said outer panel portions for supporting said inner and outer panel portions, header means extending between said outer panel portions and adapted to support advertising material thereon, illuminating means secured to said panel portions and adapted to illuminate said header means, and a pair of horizontal shelf panels secured between two lower edges of said panel portions to constitute a generally horizontal shelf between said panel portions.

3. A display module adapted to be connected to another display module to form a display device, said display module comprising: a pair of pivotally mounted panels, said panels including a wall portion, channel members disposed about the periphery of said wall portion, at least one of said panels having retractable and extendible legs, said legs being guided by said channel members for sliding movement between the retracted and extended positions, pivot means for pivotally mounting said panels to one another to fold into a face-to-face relationship for ease of transporting said module, and handle means secured to at least one of said panels for gripping while being carried.

4. In a portable display device, a pair of substantially identical modules each having a pair of foldable wall panels, a display wall on each of said panels, means pivoting the respective wall panels of each module when in face-to-face relationship for protecting advertising material carried thereon, each of said panels having a framework disposed about the peripheral edges thereof, each of said frame elements being formed of an extrusion having twin channels one of which channels receives the wall of said panel, leg means disposed to slide within the other channel of selected ones of said frames, handle means secured to the rear surface of at least one of said walls, means on each of said modules for securing said panels in a winged relationship, means for joining said modules together to constitute said display device, header means secured between said winged panels, illuminating means behind the header, and means on the rear side of said walls for securing said header means and illuminating means to one of said panels in each of two modules for transporting.

References Cited by the Examiner

UNITED STATES PATENTS

| | | | |
|---|---|---|---|
| 1,649,996 | 11/1927 | Toth | 2—2.5 |
| 2,145,431 | 1/1939 | Panza | 160—229 |
| 2,576,384 | 11/1951 | Bentley | 160—135 |
| 2,587,698 | 3/1952 | Corn et al. | 160—135 |
| 2,784,779 | 3/1957 | Knipfer et al. | 160—135 |
| 2,855,037 | 10/1958 | Steffel | 160—135 |

CHANCELLOR E. HARRIS, *Primary Examiner.*

CLAUDE A. LE ROY, *Examiner.*

W. D. LOULAN, *Assistant Examiner.*